United States Patent [19]

Sato

[11] Patent Number: 5,087,641
[45] Date of Patent: Feb. 11, 1992

[54] POROUS POLYTETRAFLUOROETHYLENE RESIN MATERIAL

[76] Inventor: Yoshiaki Sato, 350-7 Kawadera, Hanno, Saitama, Japan

[21] Appl. No.: 576,337

[22] Filed: Aug. 31, 1990

[30] Foreign Application Priority Data

Sep. 1, 1989 [JP] Japan .................................. 1-227142

[51] Int. Cl.⁵ ................................................ C08J 9/40
[52] U.S. Cl. ........................................ 521/53; 521/54; 521/134; 521/918
[58] Field of Search .................... 521/53, 54, 134, 918

[56] References Cited

U.S. PATENT DOCUMENTS

| | | | |
|---|---|---|---|
| 3,451,842 | 6/1969 | Kurz et al. | 521/54 |
| 4,379,858 | 4/1983 | Suzuki | 521/54 |
| 4,387,168 | 6/1983 | Morita | 521/54 |

OTHER PUBLICATIONS

Database WPI Abstract 77-780684-Derwent.

*Primary Examiner*—Morton Foelak
*Attorney, Agent, or Firm*—Gary A. Samuels

[57] ABSTRACT

A porous polytetrafluoroethylene resin material which comprises sintered or irradiated fluororesin powder inside the porous spaces of a continuously porous polytetrafluoroethylene resin base material.

1 Claim, No Drawings

POROUS POLYTETRAFLUOROETHYLENE RESIN MATERIAL

FIELD OF THE INVENTION

The present invention relates to a porous polytetrafluoroethylene resin material which is suitanle for use as an electrical insulating material.

BACKGROUND OF THE INVENTION

Polytetrafluoroethylene reins (hereafter referred to as "PTFE") are widely used in various applications as a result of their superior electrical characteristics, heat resistance and chemical resistance. In cases where such resins are used electrical insulating materials, attempts have been made to further improve the electrical characteristics by making said resins porous.

Since molten PTFE has a markedly high viscosity, foaming methods used in ordinary thermoplastic resins or other fluororesins (e.g., physical foaming accomplished by blowing in an inert gas, or chemicl foaming accomplished by means of foaming agents, etc.) cannot be used to foam PTFE. Accordingly, special methods must be used in order to manufacture porous PTFE. One method is a method in which (i) substances which can be removed by extraction or dissolution are mixed with PTFE, the mixture is molded under pressure, and the aforementioned substances are then removed. Another method is one in which a liquid lubricant is added to finely powdered PTFE, this mixture is molded under conditions in which a shearing force is applied by extrusion or rolling, the aforementioned liquid lubricant is then removed, and the material is drawn and sintered. Still another is one method in which an unsintered PTFE molding is drawn in a liquid which can wet PTFE (e.g., a halogenated hydrocarbon, petroleum hydrocarbon, alcohol or ketone, etc.), and is then sintered.

However, in all of these methods, the porous material obtained is a continuously porous material. As a result, the internal pores are easily crushed by even a slight compressive force, so that portions of the material that are subjected to compression tend to be converted into a non-porous structure. This tendency is especially conspicuous in cases where the porosity is increased in order to lower the dielectric constant. Accordingly, in cases where such materials are formed into tapes or sheets, etc., and used as insulators for electric wires or printed circuit boards, etc., the electrical characteristics of the materials (dielectric constant, etc.) tend to be unstable, so that said materials are extremely difficult to handle.

SUMMARY OF THE INVENTION

The present invention provides a porous PTFE material which has pores that are difficult to crush, and which is therefore able to maintain stable electrical characteristics.

The porous PTFE material of the present invention contains a sintered fluororesin powder or an irradiated fluororesin inside the porous spaces of a continuously porous PTFE base material.

The sintered or irradiated material is sometimes referred to hereinafter as "hard".

DESCRIPTION OF THE INVENTION

The porous PTFE material used in the present invention can be made by any known method; however, it is desirable to use a base material which has been made porous by drawing or stretching, in order to insure that a high porosity is obtained, and thus obtain good retention of the hard fluororesin. When drawn, PTFE forms a fine continuously porous structure consisting of fibers and nodes which are interconnected to each other by said fibers.

Examples of powders which can be used as the hard fluororesin powder inside the porous spaces of the abovementioned porous PTFE base material include (a) a hard PTFE powder obtained by sintering an unsintered PTFE powder beforehand at a temperature above the melting point of PTFE (327° C. to 400° C.), and then pulverizing this sintered PTFE mechanically or by a method such as irradiation with an electron beam, etc., and (b) a powder obtained by radiation-bridging an ethylene-tetrafluoroethylene copolymer resin (EPTFE) and then pulverizing this resin, etc. There are no particular restrictions on the amount of fluororesin used; this amount may be appropriately set in the range of about 5 to 20% by weight. In cases where the material of the present invention is used as an electrical insulating material, a fluororesin powder content of approximately 5 to 10 wt % is desirable. The abovementioned fluororesins are ordinarily used in the form of fine powders.

In order to get such powders inside the porous spaces of the aforementioned porous PTFE base material, a method in which the base material is impregnated with a dispersion of the powder is useful. Furthermore, it is also effective to use ultrasonic waves in order to impregnate the base material with a dispersion of the fluororesin powder used. A liquid which is able to wet the porous PTFE base material and which is able to disperse the fluororesin powder thoroughly is used as the dispersion medium of the abovementioned dispersion. For example, a fluorine type solvent is suitable. In cases where it is desired to introduce a large quantity of the aforementioned fluororesin powder into the porous spaces of the porous PTFE base material, this can be accomplished by impregnating the porous PTFE base material several times with a dispersion containing a fluororesin powder whose particle size is smaller than the pore size of the porous PTFE base material. In such cases, a fluororesin powder with a particle size of approximately 0.1 to 10 microns can be used.

The porosity of the porous PTFE material is lowered as a result of the filling of the pores of said material with the aforementioned fluororesin powder; however, this lowered porosity can be increased again by subjecting the filled PTFE material to a further drawing process. In this case, since the aforementioned fluororesin powder is present inside the porous spaces of the PTFE material, the pores are not easily crushed even if the porosity of the material is high. Because the porous PTFE material has the hard fluororesin powder inside the porous spaces of said material, crushing of the pores by compressive forces is effectively prevented. Furthermore, when an unsintered porous PTFE material containing the abovementioned fluororesin powder is sintered, the hard fluororesin powder is fuse-bonded to the PTFE base material in the surface regions, so that the shape stability with respect to compressive forces is greatly improved. Moreover, since the electrical characteristics of the fluororesin are the same as (or close to) those of the PTFE base material, the admixture of said fluororesin with the porous material has little effect on the overall electrical characteristics. Accordingly, a porous material with a low dielectric constant and stable electrical characteristics can be obtained as a result of the abovementioned improved compression resistance.

EXAMPLES

Below, the porous PTFE material of the present invention is described in terms of practical examples. However, the present invention is not limited to these practical examples.

The "pore size" is determined by M.F.P. (Mean Flow Pore Size). Porosity is determined by measuring an apparent volume (A) of the expanded porous PTFE is measured in water. At this time, the water does not enter into the space of porosity owing to the characteristic of PTFE. Next, the expanded porous PTFE is immersed in methanol to allow the methanol to enter into the pores during a day under usual temperature and pressure. After methanol fully enters into the pores, the volume of the expanded porous PTFE is measured. The volume is called a real volume (B). The rate of porosity is found according to the following formula.

The rate of porosity (%) = an apparent volume (A)-a real volume (B)/ an apparent volume (A)×100.

An unsintered porous PTFE sheet with a mean pore diameter of 3 microns, a porosity of 65% and a thickness of 100 microns was prepared as a porous PTFE base material. Meanwhile, a PTFE powder obtained by sintering an unsintered PTFE powder at a temperature above its melting point and then pulverizing said sintered material. A fluororesin powder (FLUO HT, manufactured by Micro-Powders Co., mean particle size: 2 microns) was added to a fluorine containing organic solvent (Fluorinate FC72, manufactured by 3M CO.), and mixed therewith. This dispersion was placed in a metal vessel, and said vessel was positioned on an ultrasonic vibrator (frequency: 28 khz, output power: 1200 W). The abovementioned sheet-form porous PTFE base material was immersed in this disperson for 5 minutes while ultrasonic waves were applied, and the resulting material dried. Next, the sheet was turned over (i.e., the upper and lower surfaces were reversed), and the same process of immersion under the action of ultrasonic waves followed by drying was repeated. Afterward, the sheet was sintered for 3 minutes at 350° C. (under conditions which prevented heat shrinkage), and was then drawn to produce the porous PTFE material of the present invention. This sheet-form porous PTFE material contained 10 wt % PTFE powder in its porous spaces; the porosity of the material was 65% and the dielectric constant was 1.3. In order to investigate the compression resistance of this sheet, a load of 0.1 kg/cm$^2$ was applied for 10 minutes, after which the porosity and dielectric constant of the sheet were measured. The results obtained are shown in the table below.

EXAMPLE 2

A material was manufactured and tested as in Practical Example 1, except that bridged ETFE pulverized by irradiation with an electron beam was used as the fluororesin powder instead of PTFE. The results obtained are shown in the table below.

COMPARATIVE EXAMPLE

A sheet was prepared as in Example 1 without using a fluororesin powder, and was subjected to testing. The results obtained are shown in the table below.

| | Sample: | | | | | |
|---|---|---|---|---|---|---|
| | Example 1 | | Example 2 | | Comparative Example | |
| Item Measured | Before Loading | After Loading | Before Loading | After Loading | Before Loading | After Loading |
| Porosity (%) | 65 | 60 | 65 | 59 | 65 | 50 |
| Dielectric Constant | 1.3 | 1.35 | 1.3 | 1.37 | 1.3 | 1.45 |

As is seen from the above table, the effect of the aforementioned fluororesin powder on dielectric constant is small. Since the materials of the invention show little variation in dielectric constant, it is evident that porous PTFE materials according to the present invention have pores which are not easily crushed by forces.

In the examples described above, an unsintered porous PTFE base material was impregnated with a dispersion of a fluororesin powder, after which the porous PTFE material was sintered. However, it is also possible to impregnate a sintered porous PTFE base material with such a dispersion. Furthermore, it is not always necessary that the porous PTFE material be completely sintered; depending on the intended use, it may be possible to use an unsintered material or a semi-sintered material. Even in the case of an unsintered material, the presence of the aforementioned fluororesin makes the porous spaces much more resistant to crushing than they are in a material which contains no fluororesin powder.

I claim:

1. A porous polytetrafluoroethylene resin material which comprises sintered or irradiated fluororesin powder inside the porous spaces of a continuously porous polytetrafluoroethylene resin base material.

* * * * *